(12) United States Patent
Staiger

(10) Patent No.: US 6,282,664 B1
(45) Date of Patent: Aug. 28, 2001

(54) METHOD AND APPARATUS FOR SWITCHING AN ELECTRONIC SYSTEM BETWEEN AN OPERATING MODE AND STAND-BY MODE

(75) Inventor: Dieter E. Staiger, Schönbuch (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/007,298

(22) Filed: Jan. 14, 1998

(30) Foreign Application Priority Data

Jan. 30, 1997 (DE) .............................. 197 03 388

(51) Int. Cl.[7] .................. G06F 1/26; G06F 1/32
(52) U.S. Cl. ............... 713/320; 713/300; 713/310; 713/322; 713/323; 713/330; 713/340; 713/601; 714/30; 714/51; 307/125
(58) Field of Search ..................... 713/300–340, 713/601; 307/125; 714/51, 30

(56) References Cited

U.S. PATENT DOCUMENTS 5,384,721 * 1/1995 Joto ...................................... 713/321
5,471,621 * 11/1995 Ohtsuki ............................... 713/323
5,875,120 * 2/1999 Matsushima et al. ............... 713/321

FOREIGN PATENT DOCUMENTS 0 567 957 A1   4/1992  (EP).
0 750 248 A2   12/1996 (EP).

* cited by examiner

Primary Examiner—Rupal D. Dharia
(74) Attorney, Agent, or Firm—Floyd A. Gonzalez; Marc A. Ehrlich

(57) ABSTRACT

The invention relates to an electronic system, in particular a mobile data capture and data output device in which the electronic system has a processor (1) and at least one i/o unit (8) with a control unit (7), and in which the processor (1) is connected to the control unit (7), and the control unit (7) is connected with at least one i/o unit (8). The electronic system is switched to a standby-mode, in which a control software unit (2), which is connected to the processor (1) and the control unit (7) executes part of the processor work, and the control software unit (2) monitors the time when data input from at least one i/o unit (8) commences. If commencement of data input is registered the steps needed for data capture are initiated and concluded before the data input is terminated.

10 Claims, 1 Drawing Sheet

METHOD AND APPARATUS FOR SWITCHING AN ELECTRONIC SYSTEM BETWEEN AN OPERATING MODE AND STAND-BY MODE

BACKGROUND

1. Field of the Invention

The invention relates to a method and apparatus for control of an electronic system, in particular a mobile data recording and data display appliance, in which the electronic system has a processor, control software and at least one input/output unit with a control unit, in which the processor is connected with the control software and the control unit, and the control unit is connected with the control software and at least 1 input/output unit, and in which to initiate processing cycles, the processor receives an initial cycle signal via an initial oscillator cable.

2. Description of Related Art

Most current microprocessors and computers normally possess an energy saving device incorporated into the individual processor chip. This relates to hardware and relevant software components, using which the microprocessors or computer are switched during operation to differing operating modes with reduced energy consumption. One should mention particularly energy saving operating modes: reduction of oscillator frequency, sleep-mode, software standby-mode and hardware standby-mode. Energy saving forms of operation mentioned are not run by all microprocessors. The energy savings thereby achieved vary between approx. 10% and over 90% of the energy consumed by the computer in normal operating mode.

Many microprocessors incorporate automatic adjustment of the oscillator frequency, by which the microprocessor is controlled. If it is necessary for the microprocessor to develop full capacity, the oscillator frequency is 100% of the maximum oscillator frequency. If the requirement of the microprocessor is less, the oscillator frequency is reduced appropriately. But the energy consumption of the microprocessor is only reduced to a minor extent. However, the advantage of this form of operation is that it is possible to switch between forms of operation with differing oscillator frequencies, without having to restart the microprocessor. This prevents interruption of the running of application programmes using the microprocessor when switching to an energy saving mode.

What is known as the sleep-mode gives increased energy saving. This mode produces a reduction in energy consumption of approx. 30%. However, when switching to an energy saving mode, the sleep mode requires an execution break for each application programme running on the microprocessor at the time of switchover. If a computer is in "sleep-mode", no processor capacity and no screen function is available. Normally this mode is terminated by pressing any key of the computer. After this key is pressed, the computer "reawakens". If a switch is made to sleep-mode whilst an application programme is being run on the computer, the running of this application programme is continued after the key has been pressed by the user. In this way the programme sequence is continued at the point at which the programme run was previously interrupted.

A significantly increased saving of energy (>90%) is achieved with the "software-Standby" mode. Like the "Sleep-mode", on switching to the software standby-mode the execution of all application programmes running is halted. During this time the computer is not available for a user. This applies in particular to the computer screen. Normally the content of some of the registers of the microprocessor and also some of the content of internal memories of the microprocessor are retained in the software standby-mode. In order to terminate the software standby-mode and after breaking off this mode to continue processing of application programmes at the point at which the programme was previously interrupted, additional software routines are necessary.

In a further energy saving mode the energy consumption of the microprocessor is reduced to virtually zero. This is the hardware-standby mode. Unlike the sleep-mode and software-standby mode, application programmes, whose run was interrupted by switching to the energy saving mode are not continued at the point at which they were interrupted. In the hardware-standby mode one loses in particular the content of the microprocessor registers. If the hardware-standby mode is to be terminated and running of application programmes using the computer is to be recommenced, a time consuming rebooting of the computer is necessary. If the content of the microprocessor registers was saved in external memories before the occurrence of the hardware-standby mode, one has to accept a noticeable delay time when continuing the interrupted application programmes.

Consequently it is the task of the present invention to create an improved facility for energy saving operation of a microprocessor or computer.

SUMMARY OF THE INVENTION

This task is solved by the technical exposition set out in the independent claims.

The significant advantage achieved with the invention compared with existing technology is that to save energy a large proportion of the electronic components of a mobile data recording and display device can be switched off without the user noticing it.

In particular, those electronic components which need to be available to recognise the commencement of data input continue to be available.

The invention can be implemented with very little additional hardware requirement. We can easily adapt it for different microprocessors or computers and it can be optimised for them.

In one advantageous version of the invention, a control unit, at least one input/output unit and the control software are operated by means of a cycle signal, which is created by an oscillator. In this way these parts of the electronic system can be operated independently of the processor.

In one useful version of the invention the control software is used to recognise the commencement of data input by means of at least one input/output unit (i/o unit) and this then triggers the processes necessary for capturing the data input before the input is terminated. The advantage is that this ensures that any data input is immediately perceived by the user of the data recording and display device and the data is captured in good time.

In another useful version of the invention, the control software produces an interruption signal, the processor is started by means of the interruption signal, the steps needed to capture the data input are initiated by the processor and the steps needed to capture the data are completed before the data input is terminated. This ensures that the processor "awakens" to capture and process the data to be input by the user.

There can be a useful provision for the electronic system to be switched back to the standby-mode after conclusion of the recording of data input, and in this way a switch is made again to an energy saving mode without time delay and there is optimum saving of energy.

One advantageous version of the invention provides for the processor to be switched off. This is a way of saving considerable energy.

A useful provision is for the control software to monitor the time when individual data input is commenced using several i/o units, and the individual data input is recorded in accordance with an appropriate weighting of the numerous i/o units, before the individual data inputs are terminated. This is useful if the individual time expended for recording the individual data inputs is different. By using the weighting it is possible to commence first of all with recording of the data input for which the greatest amount of time is required. In this way it is possible to ensure that all individual data inputs are captured before the data inputs are terminated.

In one advantageous version of the invention the individual weighting of the numerous i/o units is specified before switching to the standby mode. If one has numerous data inputs from numerous i/o units, it is possible to commence immediately with the capture of these data inputs. It is not necessary for any weighting between the numerous data inputs to occur beforehand. This would represent delay in commencing the data capture.

BRIEF DESCRIPTION OF THE DRAWINGS

The foregoing and other advantageous features of the present invention are particularly pointed out and distinctly claimed in the claims accompanying this specification. Further explanation of the present invention is offered via a detailed description of a preferred embodiment of the invention which will provide a more complete understanding of the present invention when read in conjunction with the attached figures wherein:

DETAILED DESCRIPTION OF THE PREFERRED EMBODIMENT OF THE INVENTION

Figure 1:
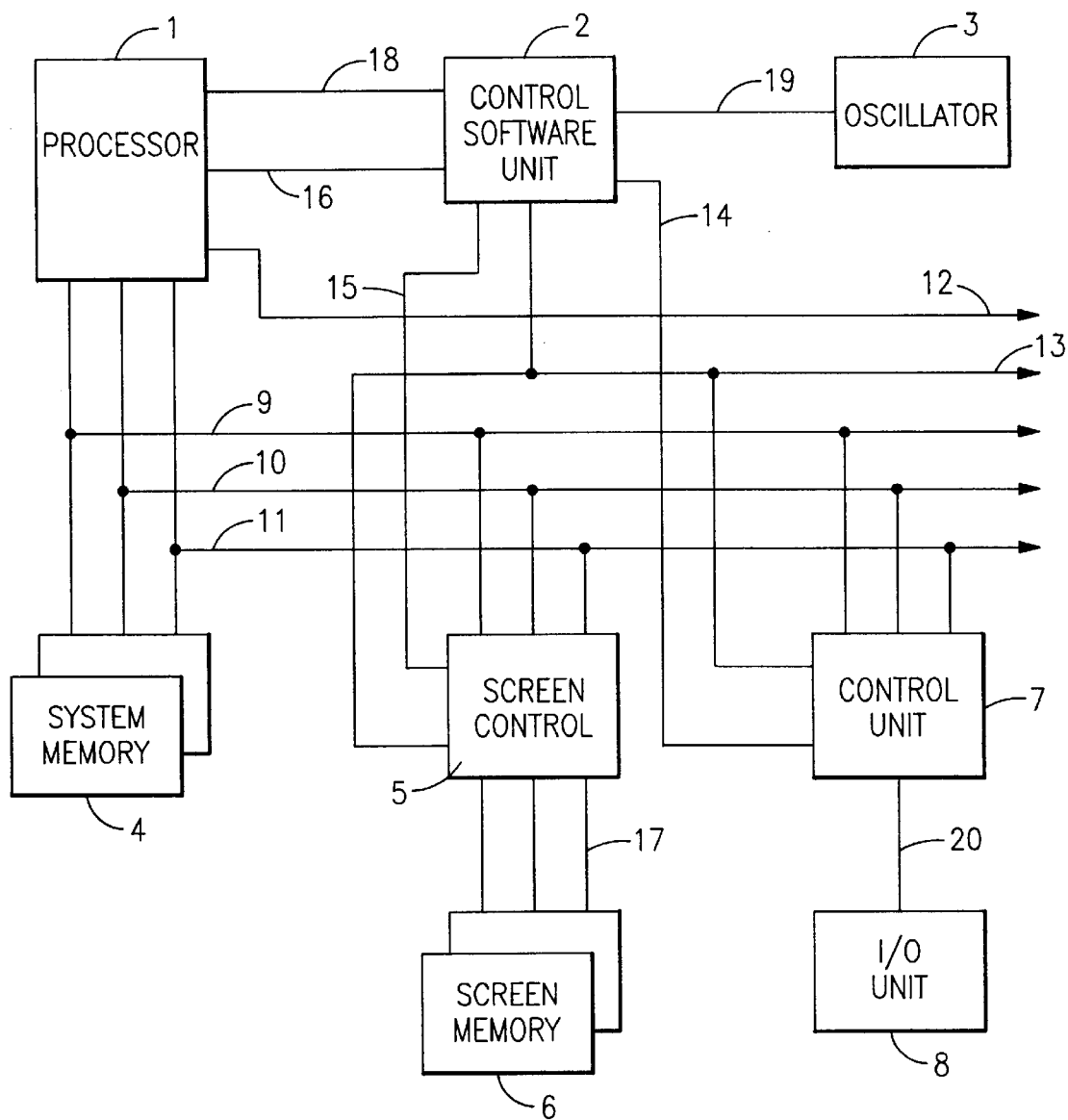
Fig. 1 shows an electronic system capable of switching between an operating mode and a stand-by mode in accedence with the preferred embodiment of the invention.

One example version of the invention is explained in more detail hereafter using a drawing. FIG. 1. shows an electronic system to demonstrate the invention.

According to FIG. 1 the electronic system as in the invention has a processor 1, a system memory 4, a screen control 5 and a keyboard control 7. These four components of the electronic system are connected to each other via an address cable 9, a data cable 10 and a control cable 11, so that addresses, data or control signals can be exchanged via the corresponding cables. The screen control unit 5 is connected by cables 17 with a memory 6. The keyboard control unit 7 is connected with the keyboard 8. In addition, the electronic system has an oscillator 3, which is connected directly with control software 2. The control software 2 is connected directly via cables 14, 15, 16 and 18 with the processor 1, the screen control unit 5 and the keyboard control unit 7. The keyboard control unit 7, the screen control unit 5 and the control software 2 are in addition connected to a second oscillator cable 13.

In addition to the components described, the mobile data recording and display device can have further components. These are connected with the components described via the appropriate cables 9–12.

The keyboard control unit 7 and screen control unit 5 receive the cycle signal needed for them to operate via the cable 13 from the control software 2. The control software 2 provides the cycle signals using the oscillator 3. The processor 1 can also receive cycle signals from the control software 2 via the cable 18. This connection 18 between the processor 1 and the control software 2 can if necessary also be interrupted. Other components of the mobile data recording and data display device can receive cycle signals via the cable 13. Via the oscillator cable 13, all components of the mobile data recording and display device receive cycle signals, if it is necessary for them to be ready for operation in the energy saving standby-mode. All other components not required during the energy saving standby-mode, receive cycle signals via a further oscillator cable 12, which connects these other components with processor 1.

Using the control software 2, the mobile data recording and display device can be switched to a standby-mode. This standby mode is characterised by the fact that processor 1 and components are essentially switched off. However, the user of the data recording output device is not aware of this standby-mode since the components used by him (keyboard 8, screen), continue to be available for interaction. The processor 1 and the components switched off are only switched on again if their use is essential. There must be a guarantee that any application programme, whose running has been interrupted by switching to the standby-mode, can be continued without loss of data. Consequently the energy saving modes suitable for the processor 1 are in particular the sleep-mode and software standby-modes described.

In standby-mode the control software 2 also ensures that the screen content of a programme application active at this time continues to be displayed, although the processor 1 and other components are switched off. This gives the user of the data recording and output device the impression that the device is available unchanged. The user is not aware of the switch over to standby-mode. In particular, the screen content to be depicted can involve an active cursor.

If the data recording and output device is in standby-mode, the control software is used to perceive whether a key of keyboard 8 has been pressed. In standby-mode it is not possible to perceive which key of keyboard 8 has been pressed. Determination is made as to whether and at what time a key of the keyboard 8 is pressed.

If a key of keyboard 8 is pressed, the control software 2 receives a signal from the keyboard control unit 7 via the cable 14.

The control software 2 generates an interrupt which is transmitted to the processor 1 via the cable 16. This is the signal for the processor 1 to terminate its energy saving mode. The processor then initiates the necessary steps to determine which key of the keyboard 8 has been pressed. For the exchange of signals with the memory 4 and the keyboard control unit 7, it uses the cables 9, 10 and 11. After the key has been identified, the character allocated to this key is stored in the memory 6 of the screen and displayed on the screen. If no other data inputs are recorded by the control software 2, the device is then switched back to the standby-mode.

It is of decisive importance that the time required from awareness of the commencement of input of data (keyboard operation) until recording of the content of the data input (recognition of the key pressed) is shorter than the time required by the user to input the data into the device. As an example, situations of this type arise with the input of text. The average input time for one letter for an experienced person is approx 375 msec. to store and display the letter on the screen the processor requires, on the other hand, only approx 2 microsec. Although the precise time requirement depends to a large extent upon the processor used and its cycle frequency, it is nonetheless also significantly shorter than the input time. If the time between recognition of the input of a letter and the recording of the letter is approx 1 msec, as can be easily understood this leaves 99% of the time for switching to the standby-mode. During this time the processor 1 can be switched to an energy saving mode. During this time the control software 2 keeps those components (keyboard 8, screen) needed for interaction with the user operational.

The provision of components of the device for interaction with a user is an example of the method of operation of the control software 2. But other components of a data recording and data output device can be made available to operate using the control software 2, whilst the processor is switched off. One example which could be mentioned are the components of a car engine control. In this case, using the control software it is possible to implement a mode in which it is possible to receive data from the engine components, gears, clutch etc., whilst the central processor is switched off or is in some other energy saving mode. The control software 2 monitors the time when data input commences from the components to the central processor. If commencement of data input is established, the necessary steps for data recording are initiated.

Using the control software it is possible to specify the sequence in which the data is to be captured from the individual components. If data input commences simultaneously in several components such data is processed by the processor in accordance with specified sequence. For preference in specifying the sequence of data inputs to be captured it is possible to take into consideration the importance of the data inputs and the time periods required in each case for the data inputs. The sequence of data captured can be specified from the time when the car engine control system is installed. But it is also possible to specify the sequence subsequently or change the sequence specified originally. In this way it is possible to react in a flexible manner to altered operating conditions.

Using electronic components with which the appropriate specialist is familiar, the control software 2 can be adapted to any requirement of a data recording and output device. This enables optimum energy saving effect to be achieved. The circuits needed for the control software require only minor additional "gate count" to the ASICs (Application Specific Integrated Circuit) or FPGAs (Field Programmable Gate Array) already present in most cases.

Depending upon the task requirements it can be shown to be useful to incorporate an entirely specific integrated circuit for the control software.

Having described in detail my invention, the subject matter which I consider to be new and for which protection via Letters Patent is desired is presented in the attached claims, wherein I claim:

What is claimed is:

1. A method for controlling an electronic system for the purpose of saving energy therein, said electronic system having a processor and at least one I/O unit with a control unit, and in which the processor is connected to the control unit and the control unit is connected with said at least one I/O unit, and wherein a control software unit is connected to said control unit, said method comprising the steps of:

detecting, at said control software unit whether a data input has taken place at said at least one I/O unit;

switching said electronic system to a stand-by mode if no data input has taken place via said at least one I/O unit for a period of time, said switching step including turning off said processor said switching being done by said control software unit;

executing by said control software unit part of said processor's work related to the operation of said at least one I/O unit instead of said processor while said electronic system is in said stand-by mode;

monitoring if data input commences through said at least one I/O unit during said stand-by mode; and in the event data input is detected, switching the electronic system from said stand-by mode to an operating mode such that data inputted during the stand-by mode may be captured by said processor.

2. The method of claim 1 wherein said control unit, said at least one I/O unit and said control software unit are operated by means of a cycle signal which is generated by an oscillator.

3. The method of claim 1 further including the steps of:

identifying the commencement of data input at least one said I/O units via said control software unit; and initiating processes needed to capture said data input, wherein said processes needed to initiate capture of said data are completed before said data input is terminated.

4. The method of claim 3 further comprising the steps of:

creating at said control software unit an interrupt signal for starting said processor, said started processor performing said initiating step for capture of said data input.

5. The method of claim 4 further comprising the step of: switching the electronic system back to standy-by mode by turning off said processor after completion of capture of said data input.

6. The method of claim 5 wherein further comprising the steps of:

monitoring at said control software unit the time when individual data input from a plurality of said I/O units commences, and the time when individual data inputs are captured in accordance with individual weighting of at least two of said I/O units, before said individual data inputs are terminated.

7. The method of claim 6 in which individual weighting of said at least two I/O units is specified before switching to said standby-by mode.

8. An electronic system having a processor, a control unit, at least one I/O unit, said processor connected with said control unit and said control unit connected with said at least one I/O unit, said electronic system comprising:

a control software unit connected with said processor and with said control unit, said control software unit for switching said electronic system to a stand-by mode if no data input has taken place via said at least one I/O unit for a period of time by turning off said processor and concurrently enabling operation of said at least one I/O unit during said stand-by mode;

an oscillator coupled to said control software unit, said control unit and said at least one I/O unit, said oscillator enabling said control software unit to provide cycle signals required for operating said electronic system;

a control circuit in said control software unit responsive to said oscillator for executing part of said processor's work related to the operation of said at least one I/O unit instead of said processor while said electronic system is in said stand-by mode;

a monitoring circuit in said control software unit for monitoring if data input commences through said at least one I/O unit during said stand-by mode; and an interrupt circuit in said control software unit for, in the event data input is detected, switching the electronic system from said stand-by mode to an operating mode such that data inputted during the stand-by mode may be captured by said processor.

9. The electronic system of claim 8 in which said monitoring circuit determines commencement of data input using said at least one I/O unit and for initiating, responsive to said determining, processes needed for capture of said data input before said data input is terminated.

10. The electronic system of claim 9 in which said interrupt circuit generates an interrupt signal for starting said turned off processor, said started processor initializing steps necessary for capture of said data input.

* * * * *